United States Patent
Chen

(10) Patent No.: US 9,882,487 B2
(45) Date of Patent: Jan. 30, 2018

(54) VOLTAGE REGULATOR HAVING WIDE COMMON VOLTAGE OPERATING RANGE AND OPERATING METHOD THEREOF

(71) Applicant: REALTEK SEMICONDUCTOR CORP., Hsinchu (TW)

(72) Inventor: Leaf Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/593,177

(22) Filed: May 11, 2017

(65) Prior Publication Data
US 2017/0331375 A1  Nov. 16, 2017

(30) Foreign Application Priority Data
May 16, 2016 (TW) .............................. 105115039 A

(51) Int. Cl.
*G05F 1/00* (2006.01)
*H02M 3/158* (2006.01)

(52) U.S. Cl.
CPC ................................. *H02M 3/158* (2013.01)

(58) Field of Classification Search
CPC .. H02M 3/158; H02M 3/1588; H02M 3/1582; H02M 3/156; H02M 2001/0045; H02M 2001/0067
See application file for complete search history.

(56) References Cited

U.S. PATENT DOCUMENTS

| | | | |
|---|---|---|---|
| 6,552,517 B1* | 4/2003 | Ribellino | ................ H02M 1/36 323/282 |
| 7,906,952 B2* | 3/2011 | Kuo | .......................... G05F 1/56 323/274 |

* cited by examiner

*Primary Examiner* — Adolf Berhane
*Assistant Examiner* — Afework Demisse
(74) *Attorney, Agent, or Firm* — Li & Cai Intellectual Property (USA) Office

(57) ABSTRACT

The present disclosure illustrates a voltage regulator having wide common voltage operating range and an operating method thereof. The voltage regulator can solve a problem of the prior art that the excessive low or high common voltage easily causes the voltage regulator to operate abnormally. In addition, the voltage regulator completes the operation of boosting voltage by increasing additional switch transistors and error amplifiers without using a complex design, so that the lower common voltage can still satisfy with the operation condition of the voltage regulator to output the correct output voltage accordingly.

10 Claims, 5 Drawing Sheets

VOLTAGE REGULATOR HAVING WIDE COMMON VOLTAGE OPERATING RANGE AND OPERATING METHOD THEREOF

BACKGROUND

1. Technical Field

The present disclosure relates to a voltage regulator and an operating method thereof; in particular, to a voltage regulator having wide common voltage operating range and an operating method thereof.

2. Description of Related Art

Please refer to FIG. 1, which is a schematic diagram illustrating the circuit of a conventional voltage regulator. A voltage regulator 1 includes an error amplifier 10, a switch transistor 12, a resistor R and a constant current source circuit 14. The inverting input of the error amplifier 10 is electrically connected to a node A between the resistor R and the constant current source circuit 14, and the non-inverting input and output of the error amplifier 10 are electrically connected to the common voltage Vcom and the control end of the switch transistor 12 respectively.

The error amplifier 10 compares a voltage value Va of the node A with the common voltage Vcom and then determines whether to turn on the switch transistor 12 according to the comparison result. For example, when the common voltage Vcom is higher than the Va, the error amplifier 10 controls the switch transistor 12 to turn on to enable an output voltage Vout of the voltage regulator 1 to be the common voltage Vcom+(I*R), thereby boosting voltage.

The prior art has to limit the common voltage Vcom operating range to obtain the correct output voltage Vout (e.g. the lower common voltage may cause an idling circuit of the constant current source circuit 14 and lead to the incorrect output voltage Vout) in order to ensure the current source circuit to work normally. In view of this, how to decrease the influence of the common voltage operating range on the voltage regulator 2 to enable the output voltage Vout to be outputted correctly despite the excessive low or high common voltage Vcom is a technical problem to be resolved.

SUMMARY

According to one exemplary embodiment of the present disclosure, a voltage regulator having wide common voltage operating range is provided, which includes a first switch transistor, a first error amplifier, a second error amplifier and a second switch transistor. The first switch transistor has a control end configured to receive a first control signal, a first end coupled to a first end of a first resistor, and a second end coupled to a grounding voltage; wherein whether to turn on the first switch transistor is determined according to the first control signal. The first error amplifier has a non-inverting input coupled to a first node between a first end of the first switch transistor and a first end of a first resistor, and an inverting output coupled to a common voltage. The first amplifier compares a voltage of the first node with the common voltage to generate the first control signal. The second error amplifier has a non-inverting input coupled to a second node between a second end of the first resistor and a first current source circuit, and an inverting input coupled to a third node between a first end of the second resistor and a second current source circuit. The second error amplifier compares a voltage of the second node with a voltage of the third node to generate a second control signal. The second transistor has a control end configured to receive the second control signal, a first end coupled to a supply voltage, and a second end coupled to the second end of the second resistor and used as an output node of the voltage regulator; wherein the second switch transistor controls the output node to output the output voltage of the voltage regulator according to the second control signal.

According to the other exemplary embodiment of the present disclosure, an operating method of a voltage regulator having wide common voltage operating range is provided, wherein the above-mentioned voltage regulator can be applied to the present operating method. The operating method includes the following steps: comparing a voltage of the first node with the common voltage by the first error amplifier to generate a first control signal; determining whether to turn on the first switch transistor according to the received first control signal; comparing a voltage of the second node with a voltage of the third node by the second error amplifier to generate a second control signal; and controlling the output node to output the output voltage of the voltage regulator by the second switch transistor according to the received second control signal.

To sum up, a voltage regulator having wide common voltage operating range and an operating method thereof provided by the present disclosure can resolve a problem of the prior art that the excessive low or high common voltage easily causes the voltage regulator to operate abnormally. In addition, the voltage regulator completes the operation of boosting voltage by increasing additional switch transistors and error amplifiers without using a complex design, so that the lower common voltage can still satisfy the operation condition of the voltage regulator to output the correct output voltage accordingly.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
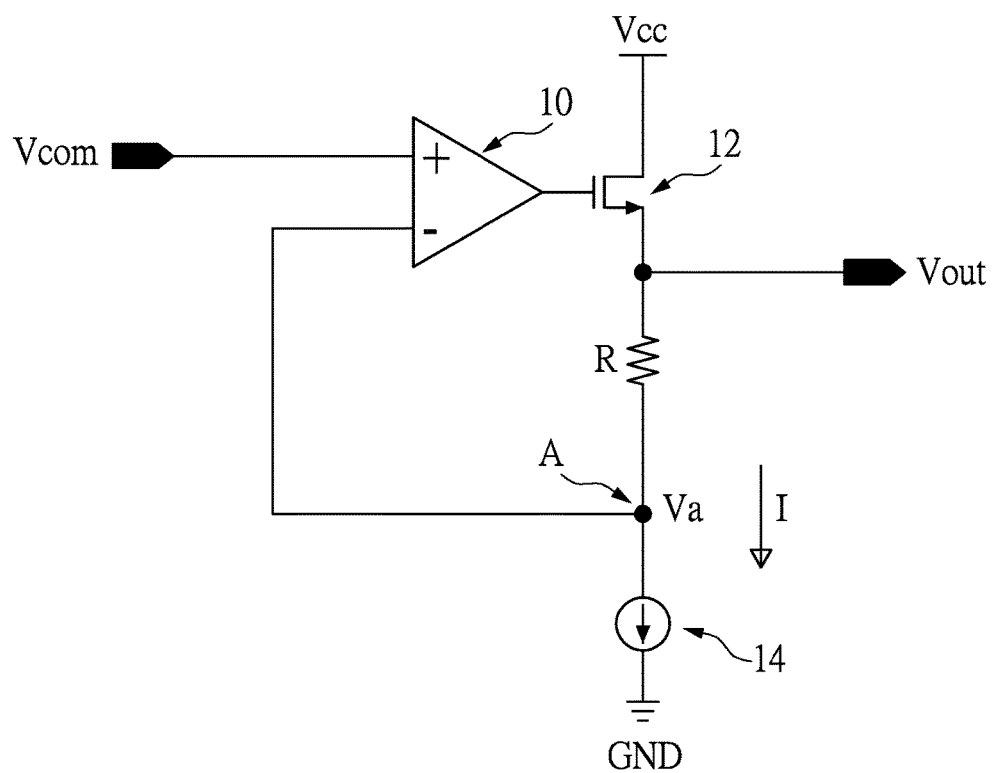
FIG. 1 is a schematic diagram illustrating the circuit of a conventional voltage regulator.

Reference will now be made in detail to the exemplary embodiments of the present disclosure, examples of which are illustrated in the accompanying drawings. Wherever possible, the same reference numbers are used in the drawings and the description to refer to the same or like parts.

Figure 2:
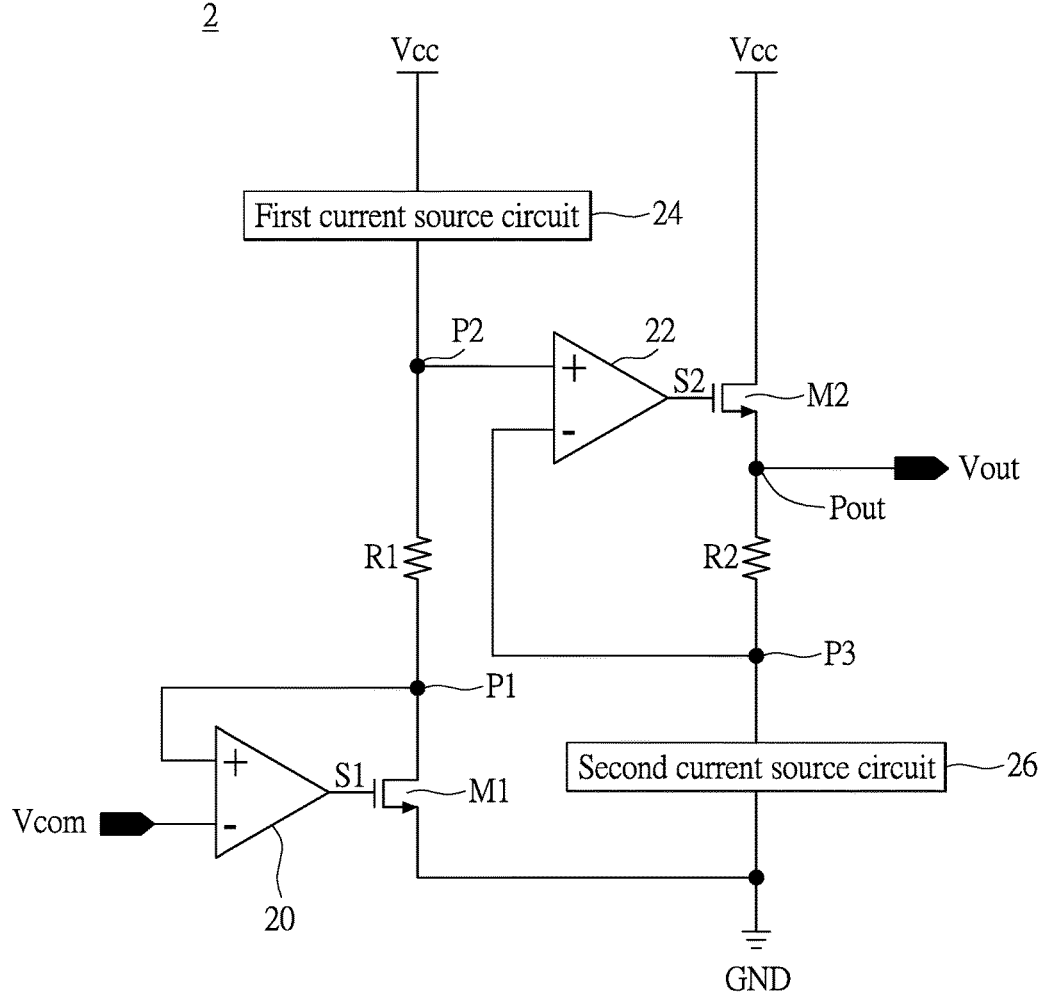
FIG. 2 is a schematic diagram illustrating the circuit of the voltage regulator having wide common voltage operating range in accordance with the present disclosure.

Please refer to FIG. 2, which is a schematic diagram illustrating the circuit of the voltage regulator having wide common voltage operating range in accordance with the present disclosure. A voltage regulator 2 includes a first switch transistor M1, a first error amplifier 20, a second error amplifier 22 and a second switch transistor M2. Said elements can be implemented by hardware circuitry, or by hardware circuitry with firmware or with software implemented by hardware circuitry, or by hardware circuitry with firmware or with software, but the voltage regulator 2 provided by the present disclosure is not limited thereto. The first switch transistor M1, first error amplifier 20, second error amplifier 22 and second switch transistor M2 can be integrated or arranged respectively, but it is not limited thereto.

The first switch transistor M1 includes a control end configured to receive a first control signal S1, a first end coupled to a first end of a first resistor R1 and a second end coupled to a grounding voltage GND, wherein whether to turn on the first switch transistor M1 is determined according to the first control signal S1.

The first error amplifier 20 has a non-inverting input coupled to a first node P1 between the first end of the first switch transistor M1 and the first end of the first resistor R1, and an inverting input coupled to a common voltage Vcom. The first error amplifier 20 compares a voltage of the first node P1 with the common voltage Vcom to generate the first control signal S1.

The second error amplifier 22 has a non-inverting input coupled to a second node P2 between a second end of the first resistor R1 and a first current source circuit 24, and an inverting input coupled to a third node P3 between a first end of the second resistor R2 and a second current source circuit 26. The second error amplifier 22 compares a voltage of the second node P2 with a voltage of the third node P3 to generate a second control signal S2.

The second switch transistor M2 has a control end configured to receive the second control signal S2, a first end coupled to a supply voltage Vcc, and a second end coupled to the second end of the second resistor R2 and regarded as an output node Pout of the voltage regulator 2, wherein the second switch transistor M2 controls the output node Pout to output the output voltage Vout of the voltage regulator 2 according to the second control signal S2.

Compared with the voltage regulator 1 of FIG. 1, the second error amplifier 22 of FIG. 2 can be regarded as the error amplifier 10 of FIG. 1 to determine whether to turn on the second switch transistor M2 according to the comparison result, and the second switch transistor M2 of FIG. 2 accordingly outputs the output voltage Vout of the voltage regulator 2. As stated previously, persons with the ordinary skill in the art should understand that the voltage regulator 2 of the present disclosure completes the operation of boosting voltage by increasing additional switch transistors and error amplifiers (i.e. the first switch transistor M1 and the first error amplifier 20 shown in FIG. 2) without using a complex design, so that the lower common voltage Vcom can still satisfy the operation condition of the voltage regulator 2 to output the correct output voltage accordingly.

Here, the first M1 and the second M2 switch transistors are, for example, n-channel MOSFET (NMOS) or p-channel MOSFET (PMOS), but it is not limited thereto. The operation and principle of boosting voltage of the first switch transistor M1 and the first error amplifier 20 are known skills, thus the detailed descriptions are omitted here for sake of brevity.

Figure 3:
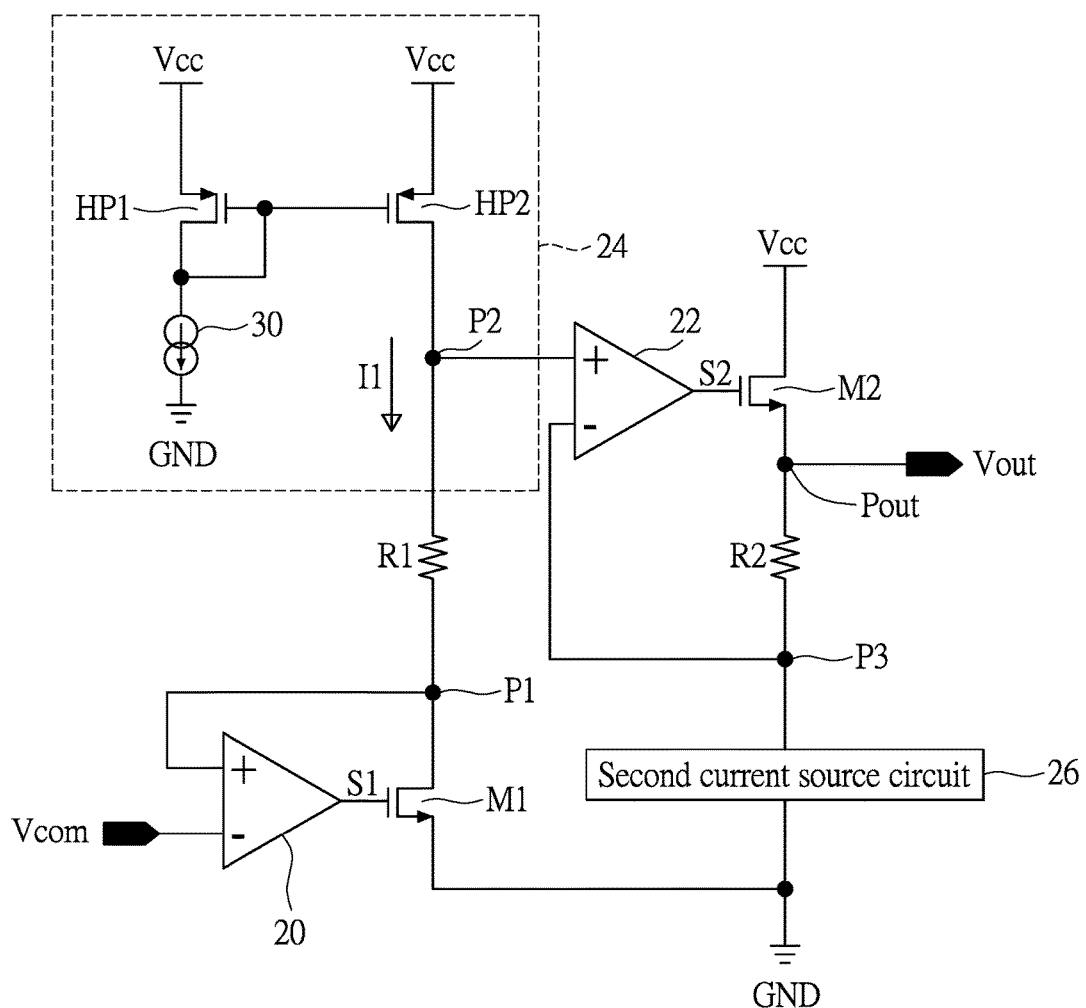
FIG. 3 is a schematic diagram illustrating the circuit of the first current source circuit of the voltage regulator of FIG. 2.

For the better understanding of the first current source circuit 24 of the voltage regulator 2, the present disclosure further provides the implementation of the first current source circuit 24. Please refer to FIG. 3, which is a schematic diagram illustrating the circuit of the first current source circuit of the voltage regulator of FIG. 2. Here, the selected embodiment is a detailed implementation of the first current source circuit 24 of the voltage regulator 2 in accordance with the present disclosure, but is not limited thereto. In addition, the same elements respectively shown in FIG. 2 and FIG. 3 are denoted with the same reference numeral, and unnecessary details are omitted hereinafter.

The first current source circuit 24 includes a first p-type transistor HP1, a second p-type transistor HP2 and a first constant current source circuit 30. The first p-type transistor HP1 and the second p-type transistor HP2 are interconnected in the form of current mirror. The first constant current source circuit 30 is coupled between the drain electrode of the first p-type transistor HP1 and the grounding electrode GND. The gate electrode of the second p-type transistor HP2 is coupled to the gate electrode of the first p-type transistor HP1, source electrodes of the first p-type transistor HP1 and the second p-type transistor HP2 are respectively coupled to the supply voltage Vcc, and the drain electrode of the second p-type transistor HP2 is coupled to the second node P2 to generate a first current I1. Thus persons with the ordinary skill in the art would understand that the first current source circuit 24 generates the first current I1 which flows to the first resistor R1 based on reference voltages (not shown) respectively applied to the first p-type transistor HP1 and the second p-type transistor HP2.

The detailed descriptions with respect to the first constant current source circuit 30 are omitted herein because persons with the ordinary skill in the art understand the principle of the current mirror. Compared with the conventional voltage regulator, the voltage regulator 2 provided in the selected embodiment is further disposed with a voltage regulation circuit which consists of the first switch transistor M1, the first error amplifier 20, the first resistor R1 and the first constant current source circuit 30 shown in FIG. 2. As the current source of the voltage regulation circuit is generated by the PMOS current mirror, the voltage regulation circuit can work normally despite the lower common voltage Vcom. In addition, when the first switch transistor M1 is turned on, the voltage of the second node P2 is generated to be Vcom+(Ia*Ra), thereby boosting a part of the common voltage Vcom in advance. Here, Ia is a first current I1 value, and Ra is a first resistor R1 value.

As previously stated, the voltage regulator 2 of the present disclosure is different from the conventional voltage regulator. In addition, the voltage regulator 2 of the present disclosure can be disposed with numerous voltage regulation circuits, wherein each of the voltage regulation circuits consists of the first switch transistor M1, the first error amplifier 20, the first resistor R1 and the first constant current source circuit 30. The common voltage Vcom has different boosting levels in different stages because the first resistor R1 and the first current I1 of each of the voltage regulation circuits are not the same. Thus it is feasible for it to be applied to different operating ranges, but the implementation of the first resistor R1 and the first current I1 of the present disclosure is not limited thereto, and can be made according to the actual requirements.

Figure 4:
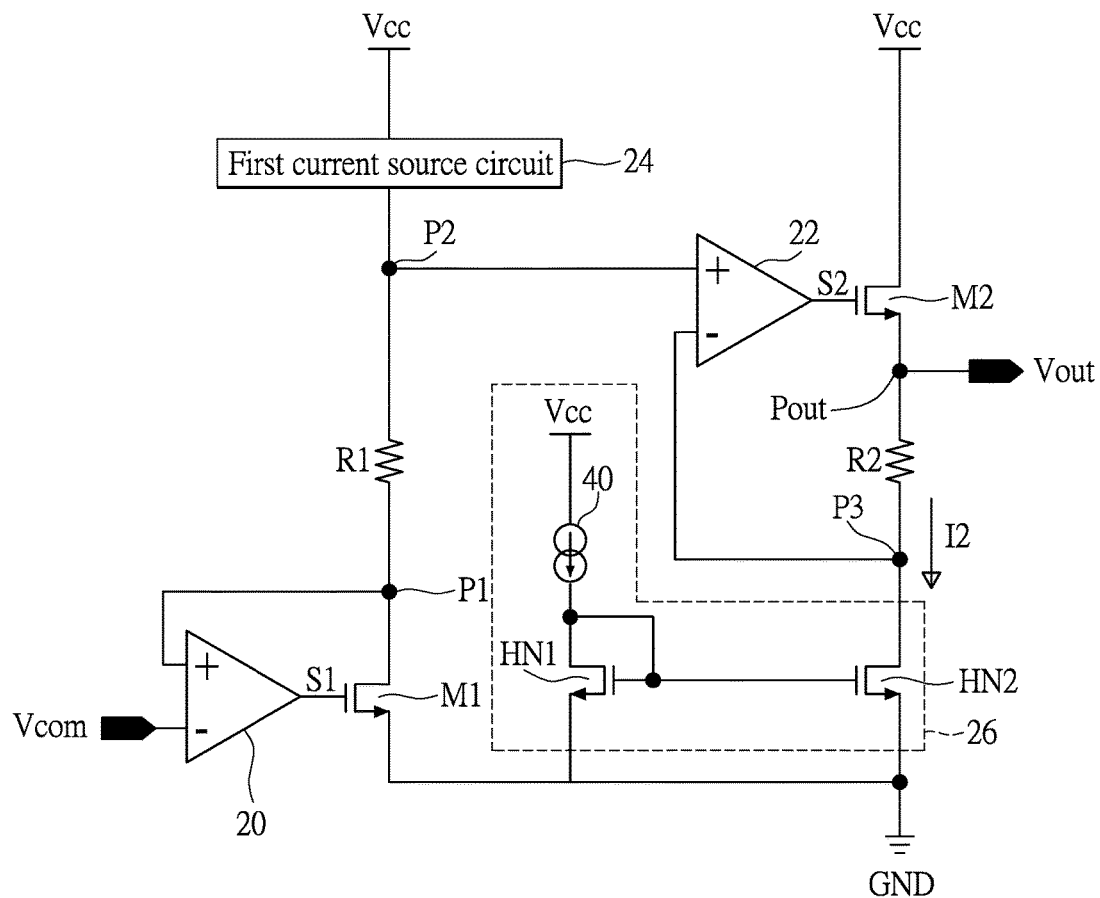
FIG. 4 is a schematic diagram illustrating the circuit of the second current source circuit of the voltage regulator of FIG. 2.

For the better understanding of the second current source circuit 26 of the voltage regulator 2, the present disclosure further provides the implementation of the second current source circuit 26. Please refer to FIG. 4, which is a schematic diagram illustrating the circuit of the second current source circuit of the voltage regulator of FIG. 2. Here, an exemplary embodiment of the second current source circuit 26 of the voltage regulator 2 of the present disclosure is provided, but it is not limited thereto. In addition, the same elements respectively shown in FIG. 2 and FIG. 4 are denoted with the same reference numeral, and unnecessary details are omitted hereinafter.

The second current source circuit 26 further includes a first n-type transistor HN1, a second n-type transistor HN2 and a second constant current source circuit 40. The first n-type transistor HN1 and the second n-type transistor HN2 are interconnected in the form of a current mirror. The second constant current source circuit 40 is coupled between the drain electrode of the first n-type transistor HN1 and the supply voltage Vcc. The gate electrode of the second n-type transistor HN2 is coupled to the gate electrode of the first n-type transistor HN1, the source electrode of the second n-type transistor HN2 is coupled to the grounding voltage GND, and the drain electrode of the second n-type transistor HN2 is coupled to the third node P3 to generate a second current I2. Thus persons with the ordinary skill in the art understand that the second current source circuit 26 generates the second current I2 which flows to the third node P3 based on reference voltages (not shown) respectively applied to the first n-type transistor HN1 and the second n-type transistor HN2.

Similarly, as persons with ordinary skill in the art would understand the principle of the current mirror, the detailed descriptions with respect to the second constant current source circuit 40 are omitted herein. The second current source circuit 26 shown in FIG. 4 is regarded as the constant current source circuit 14 of FIG. 1 and the current source is generated by the NMOS current mirror, thus the second current source circuit 26 can work normally despite the higher common voltage Vcom. In addition, when the first switch transistor M1 and the second switch transistor M2 are both turned on, the output voltage Vout of the output node Pout is generated to be Vcom+(Ia*Ra)+(Ib*Rb), thereby boosting voltage. Here, Ib is a second current I2 value, and Rb is a second resistor R2 value. However, the implementation of the second resistor R2 and the second current I2 of the present disclose is not limited thereto. It can be made according to the actual requirements.

Figure 5:
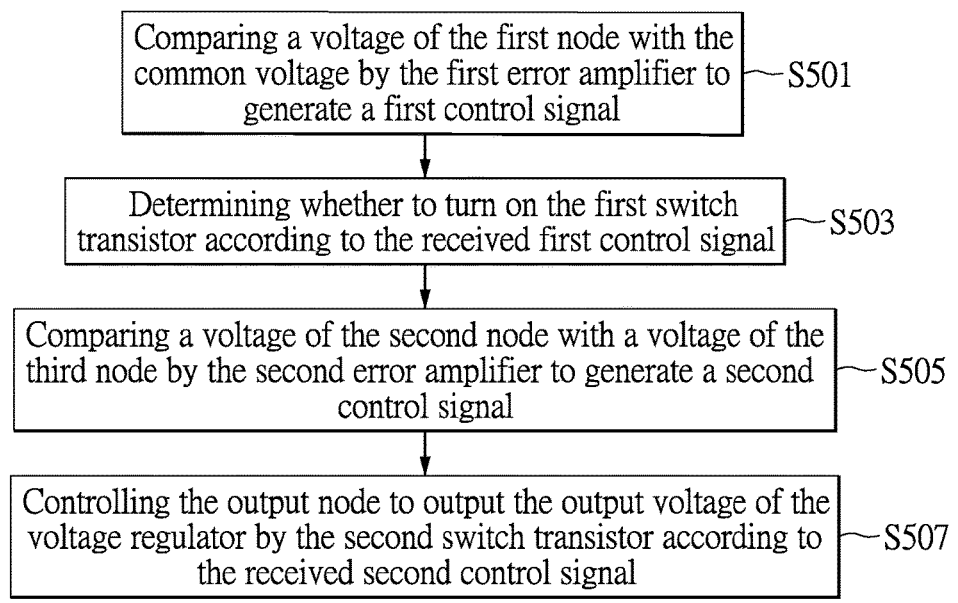
FIG. 5 is a flow chart illustrating the operating method of the voltage regulator having wide common voltage operating range in accordance with the present disclosure.

For the better understanding with respect to how the voltage regulator 2 is operated, please refer to FIG. 5, which is a flow chart illustrating the operating method of the voltage regulator having wide common voltage operating range in accordance with the present disclosure. The operating method can be applied to the voltage regulator 2 shown in FIG. 2, and please refer to FIG. 2 and FIG. 4 together for better understanding. The detailed steps have been mentioned in the preceding paragraphs, and unnecessary descriptions are not repeated.

In S501, the first error amplifier is used to compare a voltage of the first node with the common voltage to generate a first control signal. In S503, whether to turn on the first switch transistor is determined according to the received first control signal. In S505, the second error amplifier is used to compare a voltage of the second node with a voltage of the third node to generate a second control signal. In S507, the second switch transistor controls the output node to output the output voltage of the voltage regulator according to the received second control signal.

As previously stated, the first and second switch transistors are, for example, n-type metal oxide semiconductor field effect transistor or p-type metal oxide semiconductor field effect transistor, but not limited thereto. The implementation of the first and second current source circuits of the present disclosure can be made according to the actual requirements. When the first switch transistor is turned on, the voltage of the second node is generated to be Vcom+ (Ia*Ra). Here, Vcom is the common voltage, and Ia is the first current value generated by the first current source circuit and Ra is the first resistor value. Similarly, when the first and second switch transistors are both turned on, the output voltage of the output node is generated to be Vcom+ (Ia*Ra)+(Ib*Rb). Here, Ib is the second current value generated by the second current source circuit and the Rb is the second resistor value.

In summary, a voltage regulator having wide common voltage operating range and an operating method thereof provided by the present disclosure can solve a problem in the prior art that the excessive low or high common voltage easily causes the voltage regulator to operate abnormally. In addition, the voltage regulator completes the operation of boosting voltage by increasing additional switch transistors and error amplifiers without using a complex design, so that the lower common voltage can still satisfy the operation condition of the voltage regulator to output the correct output voltage accordingly.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:
1. A voltage regulator, comprising:
a first switch transistor having a control end configured to receive a first control signal, a first end coupled to a first end of a first resistor, and a second end coupled to a grounding voltage, wherein whether to turn on the first switch transistor is determined according to the first control signal;
a first error amplifier having a non-inverting input coupled to a first node between the first end of the first switch transistor and the first end of the first resistor, and an inverting input coupled to a common voltage, wherein the first error amplifier compares a voltage of the first node with the common voltage to generate the first control signal;
a second error amplifier having a non-inverting input coupled to a second node between a second end of the first resistor and a first current source circuit, and an inverting input coupled to a third node between a first end of a second resistor and a second current source circuit, wherein the second error amplifier compares a voltage of the second node with a voltage of the third node to generate a second control signal; and
a second switch transistor having a control end configured to receive the second control signal, a first end coupled to a supply voltage, and a second end coupled to a second end of the second resistor and used as an output node of the voltage regulator; wherein the second switch transistor controls the output node to output an output voltage of the voltage regulator according to the second control signal.

2. The voltage regulator according to claim 1, wherein the first current source circuit further comprises:
a first p-type transistor and a second p-type transistor which are interconnected in the form of current mirror; and
a first constant current source circuit coupled between a drain electrode of the first p-type transistor and the grounding voltage.

3. The voltage regulator according to claim 2, wherein a gate electrode of the second p-type transistor is coupled to a gate electrode of the first p-type transistor, a source electrode of the second p-type transistor is coupled to the supply voltage, and a drain electrode of the second p-type transistor is coupled to the second node to generate a first current.

4. The voltage regulator according to claim 3, wherein when the first switch transistor is turned on, a voltage of the second node is generated to be Vcom+(Ia*Ra), wherein Vcom is the common voltage, Ia is a first current value, and Ra is a first resistor value.

5. The voltage regulator according to claim 4, wherein the second current source circuit further comprises:
a first n-type transistor and a second n-type transistor which are interconnected in the form of current mirror; and
a second constant current source circuit coupled between a drain electrode of the first n-type transistor and the supply voltage.

6. The voltage regulator according to claim 5, wherein a gate electrode of the second n-type transistor is coupled to a gate electrode of the first n-type transistor, a source electrode of the second n-type transistor is coupled to the grounding electrode, and a drain electrode of the second n-type transistor is coupled to the third node to generate a second current.

7. The voltage regulator according to claim 6, wherein when the first and the second switch transistors are both turned on, the output voltage of the output node is generated to be Vcom+(Ia*Ra)+(Ib*Rb), wherein Ib is a second current value, and Rb is a second resistor value.

8. An operating method of a voltage regulator having a first switch transistor, a first error amplifier, a second error amplifier and a second switch transistor, the operating method comprising:
comparing a voltage of a first node with a common voltage by the first error amplifier to generate a first control signal, wherein the first node is between a first end of the first switch transistor and a first end of a first resistor;
determining whether to turn on the first switch transistor according to the first control signal, wherein the first switch transistor has a control end configured to receive the first control signal and a second end coupled to a grounding voltage;
comparing a voltage of a second node with a voltage of a third node by the second error amplifier to generate a second control signal, wherein the second node is between a second end of the first resistor and a first current source circuit, and the third node is between a first end of a second resistor and a second current source circuit; and
controlling an output node to output an output voltage of the voltage regulator by the second switch transistor according to the received second control signal, wherein the second switch transistor has a control end configured to receive the second control signal, a first end coupled to a supply voltage, and a second end coupled to a second end of the second resistor and used as the output node of the voltage regulator.

9. The operating method according to claim 8, wherein when the first switch transistor is turned on, the voltage of the second node is generated to be Vcom+(Ia*Ra), wherein Vcom is the common voltage, Ia is a first current value generated by the first current source circuit, and Ra is a first resistor value.

10. The operating method according to claim 8, wherein when the first and the second switch transistors are both turned on, the output voltage of the output node is generated to be Vcom+(Ia*Ra)+(Ib*Rb), wherein Ib is a second current value generated by the second current source circuit, and Rb is a second resistor value.

* * * * *